Figure 1:
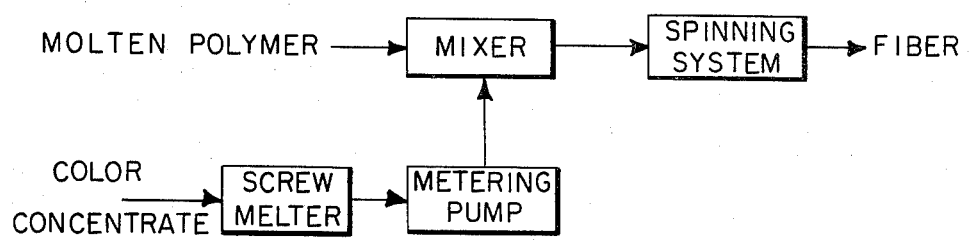

United States Patent [19]

Khanna

[11] 3,905,937

[45] Sept. 16, 1975

[54] COLOR CONCENTRATES

[75] Inventor: R. T. Khanna, Claymont, Del.

[73] Assignee: E. I. Du Pont de Nemours and Company, Wilmington, Del.

[22] Filed: Nov. 9, 1973

[21] Appl. No.: 414,287

Related U.S. Application Data

[63] Continuation of Ser. No. 241,253, April 5, 1972, abandoned.

[52] U.S. Cl. ...... 260/40 R; 106/308 N; 106/308 M; 260/37 N; 260/37 P; 260/37 NP; 260/40 P; 260/42.14; 260/42.16

[51] Int. Cl.² ............................................ C08K 9/04

[58] Field of Search ............. 260/34.2, 40 R, 42.14, 260/42.16; 106/308 N, 308 M

[56] References Cited

UNITED STATES PATENTS

| | | | |
|---|---|---|---|
| 2,649,382 | 8/1953 | Vesce | 260/34.2 |
| 2,844,489 | 7/1958 | Gemmer | 260/34.2 |
| 3,561,003 | 2/1971 | Lanham | 260/34.2 |
| 3,586,654 | 6/1971 | Lerman | 260/34.2 |
| 3,669,922 | 6/1972 | Bartsch | 260/34.2 |
| 3,674,736 | 7/1972 | Lerman | 260/34.2 |
| 3,684,771 | 8/1972 | Braun | 260/37 R |
| 3,704,255 | 11/1972 | Braun | 260/404.8 |
| 3,775,327 | 11/1973 | Thompson | 260/33.4 F |
| 3,788,996 | 1/1974 | Thompson | 260/34.2 |

FOREIGN PATENTS OR APPLICATIONS 767,376    11/1971    Belgium

*Primary Examiner*—Joseph L. Schofer
*Assistant Examiner*—P. R. Michl

[57] ABSTRACT

Color concentrates for coloring polymeric materials, which comprise
  a. colorant,
  b. deflocculating agent, and
  c. polymeric carrier.

3 Claims, 2 Drawing Figures

COLOR CONCENTRATES

This is a continuation, Ser. No. 241,253, filed Apr. 5, 1972, now abandoned.

BACKGROUND OF THE INVENTION

This invention relates to color concentrates for preparing colored synthetic fibers. It is more particularly directed to color concentrates containing unique deflocculating agents.

It is well known that synthetic fibers, particularly polyester fibers, are difficult and expensive to dye dark shades. To produce such dark synthetic fibers, it has been the practice in years past to add a pigment such as carbon black during the polymerization process. When this is done, the pigment is carried into the fiber-forming polymer itself, and consequently into the fiber.

This method has produced satisfactory fibers, but pigment added this way tends to quickly clog filters, particularly the sand-pack filters located before the spinning apparatus. Besides this, because of the nature of the process, the entire polymerization and spinning train becomes contaminated with pigment, or with dye if a dye is used, and if this equipment is then used to manufacture fiber of a different color, the whole apparatus must first be cleaned.

Repacking filters and cleaning apparatus mean that equipment lies idle while it is being worked on and this in turn means economic loss.

The color concentrates of this invention minimize these disadvantages. According to the invention, a color concentrate is added after the fiber-forming polymer has been prepared, so there is less equipment to clean. In addition, the color concentrate stabilizes the pigment so that there is far less filter clogging. For example, when carbon black is incorporated into a polyester fiber according to the invention, ordinary commercial sand-pack filters can be in continuous use for in excess of 18 days, while the same filter, used in a conventional process, clogs to the point of uselessness in only four days.

In addition to this, use of the color concentrates of the invention provides a fiber much less prone to break in winding-up or texturing.

The color concentrates provide all these advantages and, as a bonus, give fibers with more brilliant and stable colors than those fibers conventionally produced.

SUMMARY OF THE INVENTION

The Color Concentrates

The color concentrates of the invention ordinarily contain three ingredients - colorant, deflocculating agent and carrier polymer.

1. The colorant can be a pigment, a dye (soluble or insoluble in the system) such as dihydroxy-bis-arylamino anthraquinones and cyanobenzene-azoanilines, or mixtures of these.

Illustrative pigments are $TiO_2$, carbon black, zinc oxide, antimony oxide, titanates, phthalocyanines, quinacridones, isoindolenes, perylenes and silicates. Mixtures of these can also be used to get desired colors.

Concentrates of the invention can also be made with fire retardant agents such as antimony oxide or zinc oxide, optical brighteners and reinforcing agents such as asbestos.

These additives are ordinarily present in the concentrates at concentrations of from about 1 percent through about 80 percent by weight of the total concentrate, preferably from about 20 percent through about 40 percent. The concentration will of course depend on the type of additive being used, the effect desired, the nature of the fiber-forming polymer and like factors.

In some cases, it may be desirable to use from 1 through 10 percent or 1 through 15 percent of additive, sometimes 10 through 15 percent, or 10 through 20 percent. Similarly, it may be desirable to use from 40 through 50 percent, from 50 through 60 percent, or even 60 through 70 percent of certain additives. In any case, the final concentration can be easily determined by one skilled in this art using well-known principles of pigmentation.

2. Speaking broadly, the deflocculating agent can by any, or a mixture of any, polymeric materials of the type having the general structure

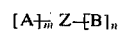

where
- A is a segment bearing one or more functional groups capable of being adsorbed on the particle surface;
- Z is an organic linking radical, which in some cases may be absent;
- B is a polymeric segment, the same as, or compatible with, the fiber-forming polymer;
- $m$ and $n$ are 1, 2, 3 or 4, the total not exceeding 4.

By "compatible" is meant that there be no phase separation on a microscopic scale.

Illustrative of classes of deflocculating agents which can be used are:

CLASS I

Addition polymers represented by the structure (1) 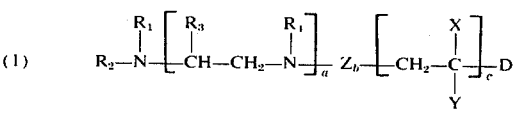

where
- $R_1$, $R_2$ and $R_4$ can be hydrogen, alkyl radicals of 1 through 4 carbon atoms, $-CH_2CH_2NH_2$ radicals, or $-CH_2CH_2OH$ radicals;
- $R_3$ and X can be hydrogen or alkyl radicals of 1 through 4 carbon atoms;
- $Z_b$ can be an organic linking radical;
- Y can be hydrogen, an alkyl radical of 1 through 4 carbon atoms, an alkenyl radical of 2 through 6 carbon atoms, -CN, halogen, phenyl, -OR,

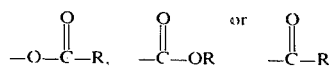

where R is an alkyl radical of 1 through 18 carbon atoms;
- D can be an end group such as hydrogen, alkyl or alkenyl;
- $a$ can be a number 1 through 2000;
- $b$ can be 0 or 1;

and
- $c$ can be a number 5 through 5000;
- the $c/a$ quotient being greater than 1.

CLASS II

Polyesters represented by the structure (2) 

where
R₁, R₂ and R₄ can be hydrogen, alkyl radicals of 1 through 4 carbon atoms, -CH₂CH₂NH₂, or -CH₂CH₂OH;
R₃ can be hydrogen or an alkyl radical of 1 through 4 carbon atoms;
$Z_b$ can be a divalent organic linking radical;
B can be a polyester or copolyester segment, number average molecular weight 500–50,000, preferably 1,000–20,000.
a can be a number 1 through 2000;
and
b is 0 or 1.

The Class II deflocculating agents preferred for use are (3) 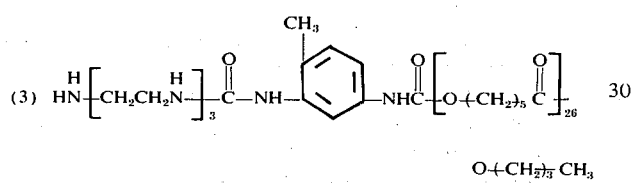

CLASS III

Polyesters represented by the structure

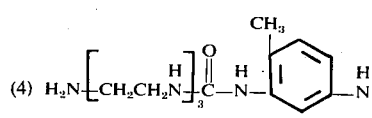

where
R₁, R₂, R₃ and R₄ can be hydrogen or -COOH (provided at least one of R₁, R₂, R₃ or R₄ is -COOH);

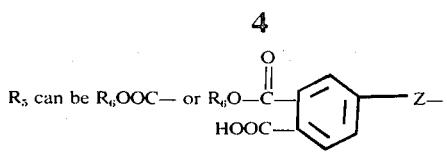

where R₆ can be hydrogen,

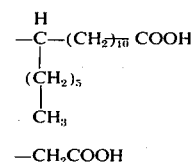

—CH₂COOH

—CH₃    

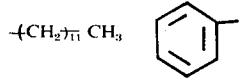

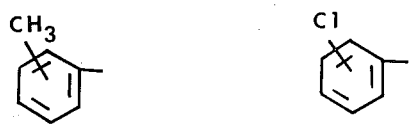

—CH₂CH₂N(CH₂CH₂OH)(CH₂CH₂OH)

—CH₂CH₂SCH₂CH₃

—CH₂CH₂CH₂COOH

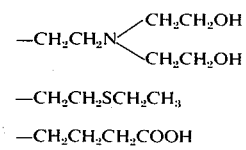

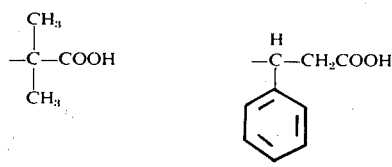

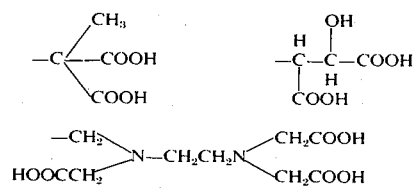

 —COOH

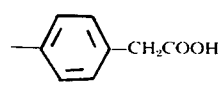 —CH₂COOH

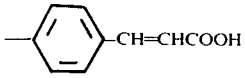 —CH=CHCOOH

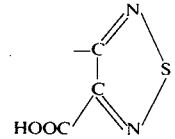

or

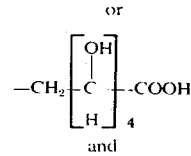

and (4) 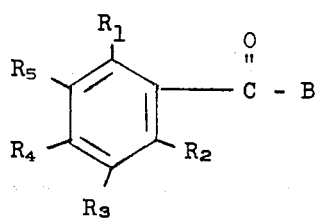

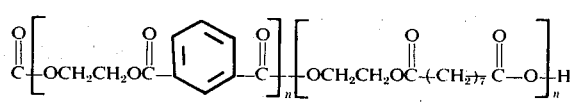

-Continued

Z can be

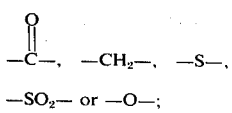

and

B can be

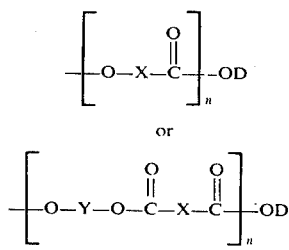

where
X and Y can be phenylene or alkylene radicals of 2 through 18 carbon atoms;
D can be a phenyl or straight- or branched chain alkyl radical of 1 through 18 carbon atoms;
and
$n$ is a number 10 through 500.

CLASS IV

Polyesters represented by the structures (6) 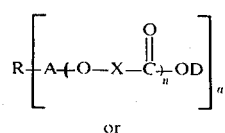

or (7) 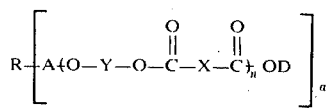

where
R can be the residue from a polyhydroxy compound;
A can be

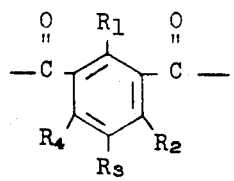

or

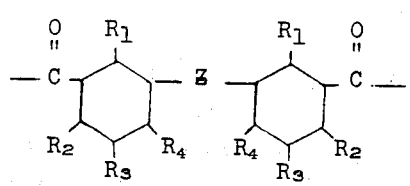

where $R_1$, $R_2$, $R_3$ and $R_4$ can be hydrogen or -COOH;

and

Z can be -C-, -CH$_2$-, -S-, -O-, or -SO$_2$-;

and
X can be phenylene or an alkylene radical of 2 through 18 carbon atoms;
Y can be an alkylene radical of 2 through 18 carbon atoms;
D can be phenyl or a straight- or branched chain alkyl radical of 1 through 18 carbon atoms;
$a$ can be a number 2 through 6;
and
$n$ can be a number 10 through 500.

CLASS V

Polyesters represented by the structure (8) 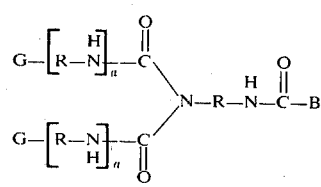

where
G can be the residue of a basic radical which, as an entity before reaction, has a pk$_a$ value of 5-14, or a salt thereof;
R can be alkylene of 2 through 36 carbon atoms, phenylene, tolylene,

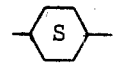

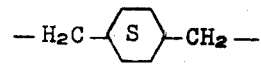

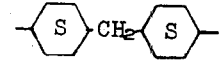

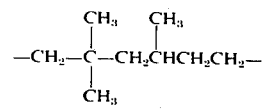

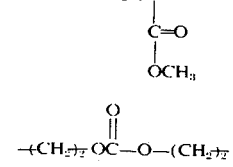

or

-Continued

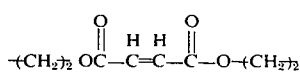

5

B can be a segment of a polyester or copolyester having a number average molecular weight of 500–50,000, preferably 1,000–20,000;

and a can be 1, 2 or 3.

The Class V deflocculating agents preferred for use are (9) 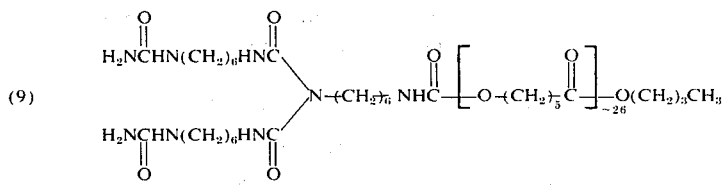

(10) 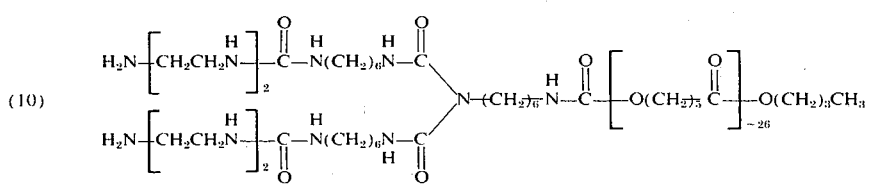

(11) 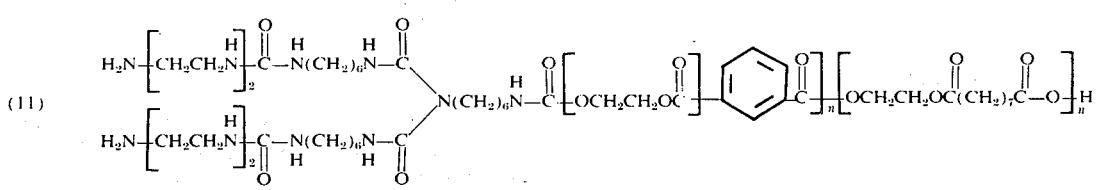

CLASS VI

Polyesters represented by the structure

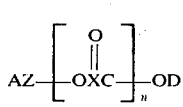

where

A can be a radical bearing at least two hydroxyl groups such as

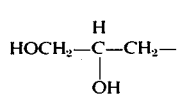   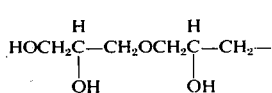

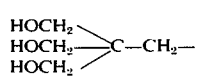   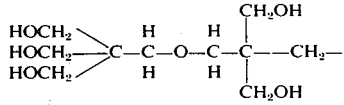

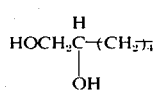

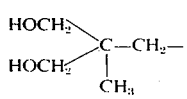   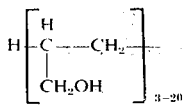

or

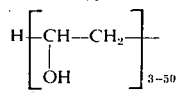

Z can be an organic linking radical;

X can be an alkylene radical of 2 through 18 carbon atoms;

D can be hydrogen or an alkyl radical of 1 through 18 carbon atoms;

and n can be a number 10 through 500.

CLASS VII

Polymeric materials represented by the structure

(13) 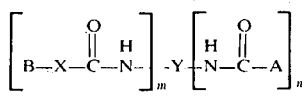

where

B can be a polymeric segment of ethylenically unsaturated monomers lacking Zerewitinoff hydrogen atoms (number average molecular weight 500–100,000 preferably 1000–10,000);

X can be the residue of a chain transfer agent;

Y can be the residue of di-, tri- or tetraisocyanate radical;

A can be the residue of an acid radical having a $pk_a$ value of -1 to 6;

and m and n can be 1, 2 or 3, the total not exceeding 4. Where n is 2 or 3, only one of A need be as defined.

Deflocculating agents of Class VII preferred for use are those where A is a mercapto-, hydroxy- or carboxy substituted carboxylic acid radical. Especially preferred are those materials where A is $$\begin{array}{c} \text{CH}_2\text{COOH} \\ | \\ -\text{S}-\text{CHCOOH} \end{array}$$

$-\text{S}-(\text{CH}_2)_n\text{COOH}$ (where $n$ is 1–3)

$$\begin{array}{c} -\text{O}-\text{CH}(\text{CH}_2)_{10}\text{COOH} \\ | \\ (\text{CH}_2)_5\text{CH}_3 \end{array}$$

$$-\text{O}-\text{CH}_2\text{CH}_2\overset{|}{\text{N}}-\text{CH}_2\text{COOH}$$
$$\text{CH}_2\text{CH}_2\text{N}(\text{CH}_2\text{COOH})_2$$

or $-(\text{CH}_2)_{10}\text{COOH}$

The Class VII deflocculating agents also preferred are those where X is $$-S-R-D$$

where R is alkylene of 1-6 carbon atoms, and

D is $-\text{O}-$, $-\text{S}-$, $-\overset{\overset{\text{O}}{\|}}{\text{C}}-\text{O}$ or $-\text{NH}-$.

Also preferred are those Class VII deflocculating agents wherein Y is $$\begin{array}{c} -(\text{CH}_2)_6-\text{N}-\overset{\overset{\text{O}}{\|}}{\text{C}} \\ \phantom{-(\text{CH}_2)_6-}\text{H} \phantom{\|} \diagdown \\ \phantom{xxxxxxxxxxxxx}\text{N}-(\text{CH}_2)_6- \\ \phantom{-(\text{CH}_2)_6-}\text{H} \phantom{\|} \diagup \\ -(\text{CH}_2)_6-\text{N}-\underset{\underset{\text{O}}{\|}}{\text{C}} \end{array}$$

[structure: two thiophene-like rings connected by CH₂]

or

[structure: tolyl group with H₃C substituent]

The Class VII deflocculating agent most preferred for use is that represented by the structure

(14) $$\text{B}-\text{SCH}_2\text{CH}_2\text{OCN}-(\text{CH}_2)_6-\text{N} \begin{array}{c} \overset{\text{O}}{\underset{\text{H}}{\|}}\phantom{xx}\overset{\text{O}}{\underset{\text{H}}{\|}}\phantom{x}\text{CH}_2\text{COOH} \\ \diagup\text{CN}(\text{CH}_2)_6\text{NC}-\text{SCH}-\text{COOH} \\ \diagdown\text{CN}(\text{CH}_2)_6\text{NC}-\text{SCH}-\text{COOH} \\ \underset{\text{H}}{\|}\phantom{xx}\underset{\text{H}}{\|}\phantom{x}\text{CH}_2\text{COOH} \\ \text{O}\phantom{xxxx}\text{O} \end{array}$$

where
B is a methyl methacrylate/2-ethyl hexyl acrylate copolymeric segment.

CLASS VIII

Polymeric materials represented by the structure

(15) $$\left[\text{B}-\text{X}-\overset{\overset{\text{O}}{\|}}{\text{C}}-\overset{\text{H}}{\text{N}}\right]_m -\text{Y}-\left[\overset{\text{H}}{\text{N}}-\overset{\overset{\text{O}}{\|}}{\text{C}}-\text{A}\right]_n$$

where
B can be a polymeric segment, number average molecular weight of 500–100,000, preferably 1,000–10,000, of ethylenically unsaturated monomers lacking Zerewitinoff hydrogen atoms;
X can be the residue of a chain transfer agent;
Y can be the residue of a di-, tri-, or tetraisocyanate radical;
A can be the residue of a mercapto-, hydroxy-, or aminoalkyl alkoxy silane radical;
and
$m$ and $n$ are 1, 2 or 3 (the total not exceeding 4).
where
$n$ is 2 or 3, only one of A need be as defined.

CLASS IX

Polymeric materials represented by the structure

(16) $$\left[\text{B}-\text{X}-\overset{\overset{\text{O}}{\|}}{\text{C}}-\overset{\text{H}}{\text{N}}\right]_m -\text{Y}-\left[\overset{\text{H}}{\text{N}}-\overset{\overset{\text{O}}{\|}}{\text{C}}-\text{A}\right]_n$$

where
B can be a polymeric segment, number average molecular weight 500–100,000, preferably 1,000–10,000, of ethylenically unsaturated monomers lacking Zerewitinoff hydrogen atoms;
X can be the residue of a chain transfer agent;
Y can be the residue of a di-, tri-, or tetraisocyanate radical;
A can be the residue of a basic radical which as an entity before reaction has a $pk_a$ value of 5–14, or a salt thereof,
and
$m$ and $n$ can be 1, 2 or 3 (the total not exceeding 4).
When
$n$ is 2 or 3, only one of A need be as defined.

CLASS X

Polyesters represented by the structure

(17) $$\left[\text{A}-\overset{\overset{\text{O}}{\|}}{\text{C}}-\overset{\text{H}}{\text{N}}\right]_m -\text{Y}-\left[\overset{\text{H}}{\text{N}}-\overset{\overset{\text{O}}{\|}}{\text{C}}-\text{B}\right]_n$$

where

A is an acid radical having a $pk_a$ value of -1 to 6;

Y is the residue of a di-, tri- or tetraisocyanate radical;

B is a polyester or copolyester segment (number average molecular weight 500–50,000, preferably 1,000–10,000);

and m and n are 1, 2 or 3 (the total not exceeding 4).

Where m is 2 or 3, only one of A need be as defined.

The Class X material preferred for use is

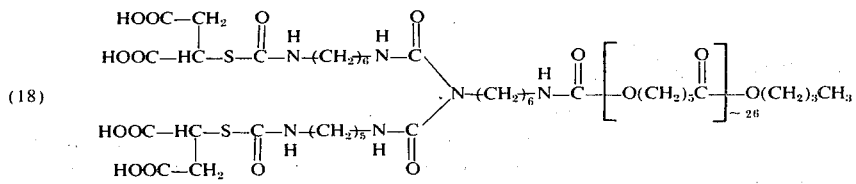

(18)

The deflocculating agents are ordinarily present in the color concentrates at concentrations of from about 1 through about 25 percent by weight of the total concentrate, preferably from about 5 through about 12 percent. Lesser amounts than this generally confer no particular advantage. Larger amounts have not adverse effect on deflocculation, but may adversely affect fiber quality.

The goal is to get maximum deflocculation without affecting the physical properties of the fiber. In certain cases one may therefore use less than 1 percent of the deflocculating agent with satisfactory result, or he may use more than 25 percent, for example, up to 35 percent or even 40 percent by weight of the total concentrate. 1 percent to 4 percent may be adequate in some cases — 12 percent to 15 percent may be preferred in some instances, and 15 percent to 20 percent or even 15 percent to 25 percent or 15 percent to 30 percent may be satisfactory in particular cases.

The pigment/deflocculating agent weight ratio should be 1–10/1.

The deflocculating agents described in formulas (1) through (18) can be prepared according to the directions in Belgian Patent 767,376 and U.S. Pat. No. 3,882,088, application Ser. No. 241,402, now abandoned and U.S. Pat. No. 3,817,944.

3. The polymeric carriers used in the color concentrates of the invention are ordinarily the same as, or of the same type as, the fiber-forming polymer. This, of course, is the preferred system. Should a different carrier be necessary for one reason or another, it can be used with satisfactory results if it is compatible with the fiber-forming polymer, "compatible," as before, meaning no phase separation on a microscopic scale. Mixtures of carriers can be used.

The carrier polymer is present in the concentrate at a concentration which is arrived at by difference, that is, one first determines the total amount of concentrate to be made, calculates the amount of pigment the concentrate is to contain, and then computes the amount of deflocculating agent needed to adequately disperse this amount of pigment in the concentrate. The difference between the total or pigment and agent is made up with carrier polymer. Ordinarily these polymeric carriers will constitute from 40 percent to about 98 percent by weight of the total concentrate.

Although one ordinarily uses a polymeric carrier for the concentrates, it may in some instances be desirable to use liquid materials such as reactive monomers, plasticizers and the like, provided of course that they are compatible with the fiber-forming polymer.

HOW THE COLOR CONCENTRATES ARE MADE

The concentrates of the invention are made by first mixing suitable amounts of pigment and deflocculating agent, and then sand grinding or ball or pebble milling this mixture for from 4 to 8 hours.

A solution of a suitable carrier polymer is then prepared in a compatible solvent. Illustrative of such solvents are toluene, xylene, methylene chloride and tetrachloroethylene. The concentration of the carrier polymer in this solution can range from about 5 percent to about 70 percent, by weight, preferably about 15 percent to 40 percent.

The pigment dispersion and solution of carrier polymer are thoroughly mixed and the mixture dried by spraying, by extrusion, by evaporation or by drying on a rotary drier. For ease of handling, the dry material can then be converted into pellets, flakes or powder by conventional means.

THE FIBER-FORMING POLYMER

The color concentrates of the invention will ordinarily be used in the preparation of colored polyester fibers. Saturated polyesters and copolyesters such as polyethylene glycol terephthalate/isophthalate and polyethylene glycol terephthalate can be used.

The concentrates can also be used to prepare colored fibers of acrylic polymers such as polyacrylonitrile, polyamides, polyolefins and polycaprolactones.

These concentrates can also be used to color polymers used in molding or extrusion, such as ABS resins, polystyrenes, aminoplast resins, unsaturated polyesters, polyvinyl chloride, polyvinylidene chloride, and rubbers such as polybutadiene, polyisoprene and ethylene/propylene/diene rubbers.

HOW FIBERS OF THE INVENTION ARE MADE

The fibers can be prepared by two basic techniques, melt-injection and flake blending. In the drawings, FIG. 1 is a diagrammatic representation of the melt-injection method. In this method molten fiber-forming polymer is passed to a mixer into which molten color concentrate is metered by means of a metering pump, having been first melted in a screw melter or equivalent apparatus.

After the molten fiber-forming polymer and color concentrate have been thoroughly mixed, the mixture is passed to a conventional spinning apparatus, where it is spun into fiber.

Figure 2:
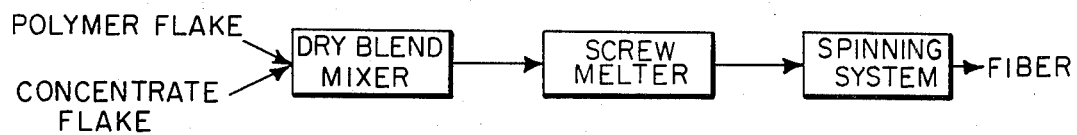

FIG. 2 is a diagrammatic representation of the flake-blending method of preparing fibers.

In this system, fiber-forming polymer flake and color concentrate flake are mixed in suitable proportions in a dry blend mixer. The mixture is then melted in a screw melter or equivalent apparatus and is then passed to a spinning apparatus where it is spun into fiber.

In either system, the color concentrate, be it in the form of a melt or a flake, is metered into the molten fiber-forming polymer stream or is mixed with the fiber-forming polymer flake in proportions to provide about 0.05–5 percent preferably 2 percent by weight of pigment in the final fiber.

In either of these methods, the selections of times, temperatures, and process details will be dictated by the type of polymer being used, the kind of pigment employed, the solvents used, and like factors. In any case, these things will be readily apparent or can be easily worked out by one skilled in this art, using well-known principles of engineering.

PREFERRED EMBODIMENTS OF THE INVENTION

The following Examples are submitted so that the invention may be more readily understood and practiced.

Those skilled in the art will no doubt be able to compose numerous variations on their central theme, such as the attachment of innocuous substituents to the deflocculating agent molecules. These variations are considered a part of the invention.

In the Examples all parts are by weight unless otherwise indicated.

EXAMPLE 1

A. Four parts of a 62.5 percent (by weight) solution in toluene of

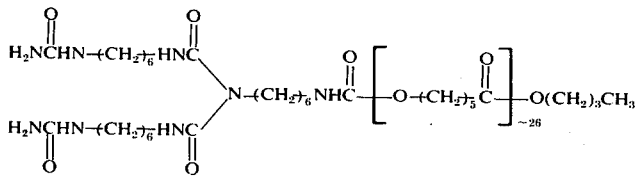

were mixed with another 20 parts of toluene.

Five parts of carbon black were then slowly added to this solution with thorough mixing. The mixture was then sand-ground to give a dispersion containing 26 percent solids, 17.25 percent pigment.

B. One hundred parts of Polycaprolactone 700* were dissolved in 113 parts of toluene. To this solution were then added, with mixing, 263 parts of the pigment dispersion in (A).

*Molecular weight 40,000, sold by Union Carbide Company.

C. The dispersion in (B) was dried in a vented twin screw, counter-rotating extruder to give strands of concentrate. These were then chopped into ⅛ inch pellets, and dried in a vacuum oven overnight at 50°C.

D. An appropriate amount of this color concentrate was screw melted and metered at a precalculated rate into a molten polyester stream[1] being spun into fiber at the rate of 10 lbs./hr. The resulting fiber, uniformly jet black, contained 2 percent by weight, of pigment.

EXAMPLE 2

| (A) | | Parts | |
|---|---|---|---|
| | Perylene Red 6818[2] | 23% | |
| | Indo Brilliant Scarlet R-6500[3] | 70% | 15 |
| | Quinacridone RT-201-D[4] | 7% | |
| | Solution of Defloculating Agent of Example 1 | | 12 |
| | and | | |
| | Toluene | | 48 | were processed as in Example 1(A).
[1]"Dacron" polyester fiber, E. I. du Pont de Nemours and Co.
[2]Holland-Suco Co., Holland, Michigan.
[3]Allied Chemical Co.
[4]E. I. du Pont de Nemours and Co.

B. Polyester[1], 36.7 parts, was dissolved in 146.8 parts of methylene chloride. To this solution was then added, with mixing, 84.4 parts of the pigment dispersion of (A).

C. The mixture prepared in (B) was stirred vigorously for 5 hours at 50°C. The resulting gel was pan dried in a vacuum oven overnight, the temperature in the oven being gradually increased from room temperature to 100°C. The dry material was then frozen in dry ice, crushed and fed into a molten polyester stream as in Example 1 to give a red fiber, containing about 2 percent pigment.

EXAMPLE 3

The mixture of colorants in part (A) of Example 2 was replaced with

| | |
|---|---|
| Phthalocyanine Blue BT-465-D[2] | 55% |
| Quinacridone RT-201-D[3] | 35% |
| Carbon Black | 10% |

A color concentrate was prepared as in Example 2 and similarly processed to give a blue fiber.
[1]Polyester Adhesive 49002, sold by E. I. du Pont de Nemours and Co.
[2] and [3] E. I. du Pont de Nemours and Co.

I claim:

1. A solid, particulate concentrate for coloring fiber-forming polymers, the concentrate comprising, as essential components,
   A. colorant, 1–80 percent by weight;
   B. 1–25 percent by weight of a deflocculating agent of Class I through Class X; and
   C. a polymeric carrier not of Class I through Class X in (B), compatible with the fiber-forming polymer.

2. The concentrate of claim 1 wherein the deflocculating agent is of Class II, Class V or Class X.

3. The concentrate of claim 2 wherein the colorant is carbon black, the carrier is polyester and the deflocculating agent is of formula (3), (4), (9), (10), (11) or (18).

* * * * *